(No Model.) 9 Sheets—Sheet 1.

R. W. JACKSON.
PIPE ORGAN.

No. 520,924. Patented June 5, 1894.

Fig. 1.

Witnesses:
Charles Pickles
Geo. L. Neuhoff

Inventor:
R. W. Jackson,
By Fowler & Fowler
Attorneys

THE NATIONAL LITHOGRAPHING COMPANY,
WASHINGTON, D. C.

(No Model.) 9 Sheets—Sheet 3.

R. W. JACKSON.
PIPE ORGAN.

No. 520,924. Patented June 5, 1894.

Fig. 3.

(No Model.)  9 Sheets—Sheet 6.

R. W. JACKSON.
PIPE ORGAN.

No. 520,924.  Patented June 5, 1894.

Fig. 13.

Witnesses:
Geo. L. Neuhoff
M. M. Brown

Inventor:
R. W. Jackson
By Fowler & Fowler
Attorneys (No Model.)  R. W. JACKSON.  9 Sheets—Sheet 7.
PIPE ORGAN.
No. 520,924.  Patented June 5, 1894.

Fig. 14

Witnesses:
Geo. L. Neuhoff
M. M. Brown

Inventor:
R. W. Jackson
By Stoddard & Tusher
Attorneys (No Model.) 9 Sheets—Sheet 8.

R. W. JACKSON.
PIPE ORGAN.

No. 520,924. Patented June 5, 1894.

Witnesses:
Geo. L. Neuhoff
M. M. Brown

Inventor:
R. W. Jackson

UNITED STATES PATENT OFFICE.

RICHARD WALTER JACKSON, OF CHESTER, ILLINOIS, ASSIGNOR TO THE JACKSON PIPE ORGAN COMPANY, OF SAME PLACE.

PIPE-ORGAN.

SPECIFICATION forming part of Letters Patent No. 520,924, dated June 5, 1894.

Application filed December 27, 1892. Serial No. 456,307. (No model.)

*To all whom it may concern:*

Be it known that I, RICHARD WALTER JACKSON, a citizen of the United States, residing at Chester, county of Randolph, and State of Illinois, have invented certain new and useful Improvements in Pipe-Organs, of which the following is such a full, clear, and exact description as will enable any one skilled in the art to which it appertains to make and use the same, reference being had to the accompanying drawings, forming part of this specification.

One of the main objects of my invention is to provide cheap and simple connections between the keys of an organ and the valves which control the speaking of the pipes.

It will be noted that the sound-board or board on which are arranged the pipes of the organ, occupies a considerably greater width from right to left (as you face the organ) than the key-board. In other words, owing to the width of the pipes and valves, it is not practicable to place each pipe directly behind its operating key, but some means must be devised for communicating the oscillation of each key to a valve situated not directly behind, but usually considerably to the right or to the left of the key. This has heretofore been done by means of a roller-board on which there is for each valve and key, a horizontal roller or rock-shaft having suitable connections at one end with the key, and at the other end with the valve, and extending widthwise across some convenient portion of the organ.

The roller-board of an organ having the same number of stops and pipes as the organ herein described would be an exceedingly complicated and expensive one, inasmuch as each roller would differ in length, and in position relative to its key and valve, from every other roller of the roller-board, so that almost each piece would require the separate attention of a skilled organ builder understanding fully the entire mechanism. To accomplish cheapness and simplicity, therefore, I so arrange the valves and keys relative to each other, that substantially duplicate connecting mechanism may be used to connect the several keys of any manual with the valves corresponding to such keys,—a result which it is impossible to achieve so long as a roller-board is employed, because the rollers must of necessity be mounted either one above or one behind the other, so that each successive roller will require key and valve connections of a different length.

In Letters Patent of the United States, No. 480,949, issued to my assignee for improvements in pipe organs, dated August 16, 1892, are described certain means for diminishing the number of pipes in organs having several stops, when any two of said stops are alike in timbre, such for example, as stopped diapason and harmonique flute. Said means consist substantially of passage-ways connecting the individual pipes respectively with two different openings, both leading to the wind-chest, but each controlled by a different valve and slide, whereby the same set of pipes is made to speak for both the musical stops which are alike in timbre, as aforesaid.

One of the features of the present invention is specially applicable to organs of the kind just named, in which the same set of pipes is used to speak for notes of different musical stops. The main objects of this feature of the present invention are, to increase the cross-section of the passage-ways or grooves through which air is admitted to the pipes as aforesaid, and to afford more room for the placing of pipes without increasing the size of the sound-board. For this purpose I arrange the said passage-ways in sets or groove-boards at different levels, whereby each passage-way may be made of great width without crowding the others. Again, when the individual passage-ways are placed at different levels, it is not necessary to make them all parallel, but those at different levels may be arranged at different angles to suit any convenient arrangement of pipes, as hereinafter more fully explained. In other words, each pipe must be placed substantially above its proper passage-way, and when the passage-ways are very narrow and are all parallel to each other, considerable inconvenience is experienced in arranging the larger pipes on the sound-board. The double groove-board, therefore, by giving some latitude to the arrangement of said passage-ways, permitting some to run in one direction and some in another, enables me better to make available the entire area of the sound-board for the placing of pipes.

The invention will be best understood by referring to the accompanying drawings, in which—

Figs. 4, 5 and 6 are drawn to somewhat enlarged scales, Fig. 4 being a plan view of the sound-board of the great organ, for example, showing the arrangement of the pipes, the fore part of the sound-board being cut away to expose some of the slides. Figs. 7 to 12 inclusive are drawn to considerably enlarged scales, Fig. 7 being a transverse vertical sectional view on the plane of line 7—7 of Fig. 4, showing the sound-board, wind-chest, and devices controlling the admission of air from the wind-chest to the pipes, as seen by looking from the right-hand side of Fig. 4. Fig. 8 is a vertical sectional view of the same portion of the organ shown in Fig. 7, taken on the planes indicated by the broken line 8—8 of Fig. 4, and also looking from the right-hand side of said Fig. 4. Fig. 9 is an isometric projection of that portion of one of the valve seats above referred to, against which are normally seated the valves controlling the lowest notes of the great organ, for instance. Fig. 10 is a similar inverted view of a portion of the groove-board (or board wherein are the grooves or passage-ways through which the air admitted by operating the keys and slides passes to the pipes) being that portion of said groove-board which corresponds substantially to the portion of the valve seat shown in Fig. 9. Fig. 11 is a vertical sectional view on the plane of line 11—11 of Fig. 7, showing a number of valves in transverse section, and in their normal position against the valve seat. Fig. 12 is a view of a modification of the parts shown in Fig. 8, having two groove-boards arranged at different levels, which modification in the instrument herein described, is applied to the swell organ, the great organ having only a single groove-board.

The same marks of reference indicate the same parts throughout the several views.

In the organ shown in the drawings (Figs. 1 and 3) the keys are arranged in three claviers, to wit: the keys 30 (Fig. 3) constituting the lower manual of the organ and operating the valves 31, which control the admission of air from a wind-chest 32 to the sets of pipes 33, 34 and 120 (Figs. 2 and 3), suitably arranged on a sound-board 36, and constituting the "great organ." In like manner the keys 37 constituting the upper manual operate the valves 38, which control the admission of air from a wind-chest 39 to the sets of pipes 40, 41 and 123 (Figs. 2 and 3) suitably arranged on a sound-board 43, and constituting the pipes of the "swell organ." The great organ may embrace the following stops: open diapason, octave, (a stop like open diapason in timbre, but tuned an octave higher) melodeon and flute d'amour. The swell organ may embrace, for example, salicional, violin, lieblich gedacht, and harmonique flute. Besides the great organ and swell organ, I may add also a pedal organ embracing, for example, such stops as grand bourdon and flute bass, which speak on very large pipes 44 and 45 (Figs. 2 and 3), and whose valves are controlled by the pedal keys. In the organ shown (Figs. 2 and 3), these large pipes 44 and 45 are arranged on a sound-board 46 at the rear of the organ and near the floor, so as to afford ample room for said pipes. The admission of air to these pipes from a wind-chest 47 is controlled by suitable valves 48 connected to the pedal keys by connecting mechanism to be hereinafter more fully described.

My invention is wholly independent of the special number, character and arrangement of slides, claviers and musical stops employed. Those named above have been selected simply for the purpose of illustrating my invention, and may, accordingly, be changed without departing from the spirit of my invention.

The valve seat 49 (Fig. 6) of the great organ, consists of a thick strong plate of substantially the same size and shape as the sound-board 36 (Figs. 3 and 4), and provided on its under surface with depressions 50 normally closed by the valves 31, arranged in rows running from the front toward the rear or transversely, and from right to left, or longitudinally across the valve seat, each depression constituting the intersection of a transverse and longitudinal row. All the depressions in the same row or line from right to left across the organ, are controlled by the same slide, and admit air for the speaking of notes of the same musical stop of the organ, while all the depressions in the same row or line from front to back are controlled by the same key and valve of the organ, and admit air for the speaking of notes of different stops. There are as many of these transverse rows of depressions (that is, rows running from front to back) in the valve seat 49, as there are keys 30 in the manual of the great organ, and each key controls a valve 31 which normally closes or covers one of said transverse rows of depressions. All the depressions controlled by the same valve communicate with pipes giving the same note nominally, (as lowest C, highest G, &c.,) but each of said pipes gives that note in a different musical stop. Thus, the transverse row of four depressions to the extreme right in Fig. 6 communicate each (via a passage-way controlled by a suitable slide) with a different pipe, all of said pipes speaking highest C of the chromatic scale, for example, but each speaking highest C of a different stop, the first depression, or depressions nearest Fig. 5 in said Fig. 6, controlling highest C of open diapason stop, the next depression in said row giving highest B of octave stop, the next of melodeon stop, and the last of flute d'amour stop. It will be observed, therefore, that if the particular valve 31 which controls this transverse row of depressions be moved from its seat, air will be admitted from the windchest 32 to as many of the four pipes giving the four different kinds of highest B as aforesaid, as are not cut off from communication with said depressions by the slides to be hereinafter described.

Figure 2:
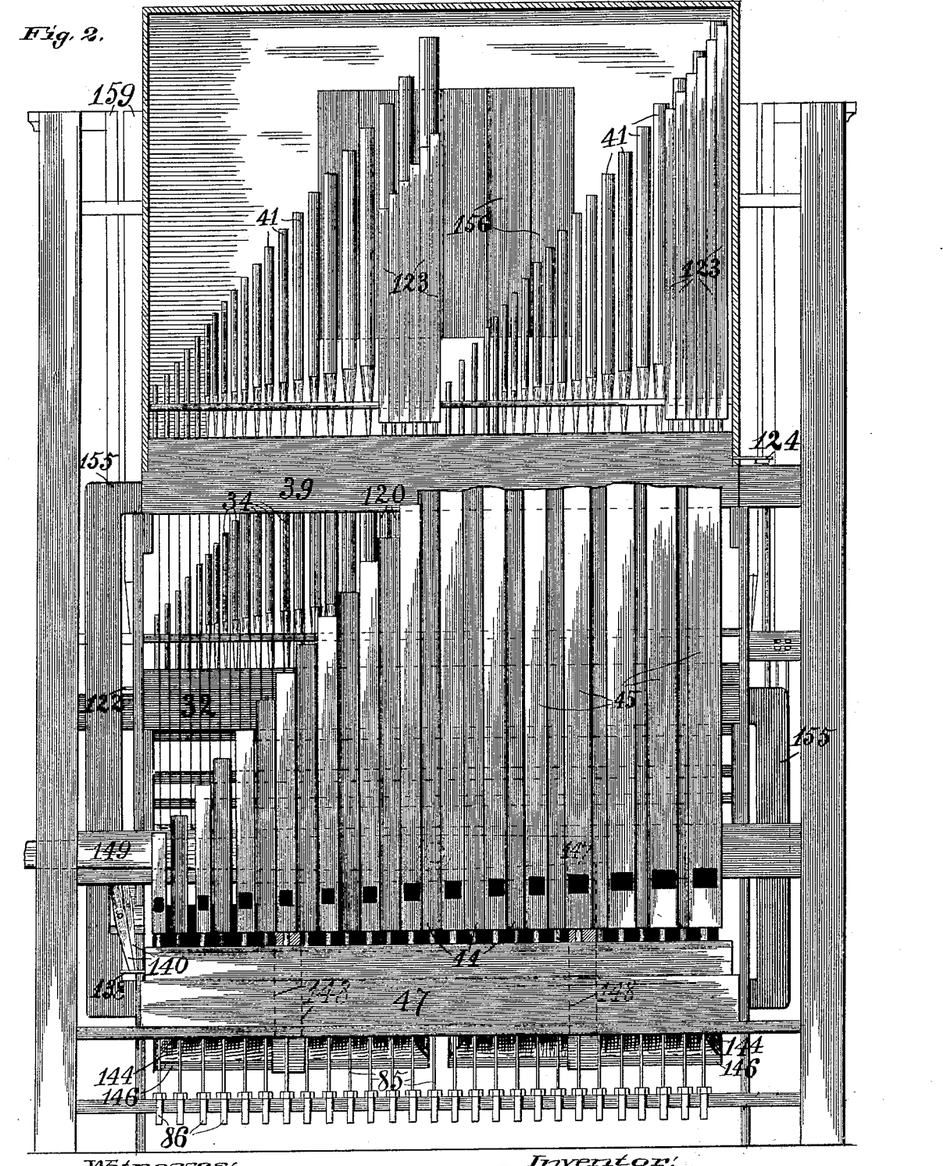
Fig. 2 is a rear elevation of such organ, showing a novel manner of arranging the pipes, some of the great bass pipes being cut away at the top so as not to hide the pipes of the swell organ.
Figure 3:
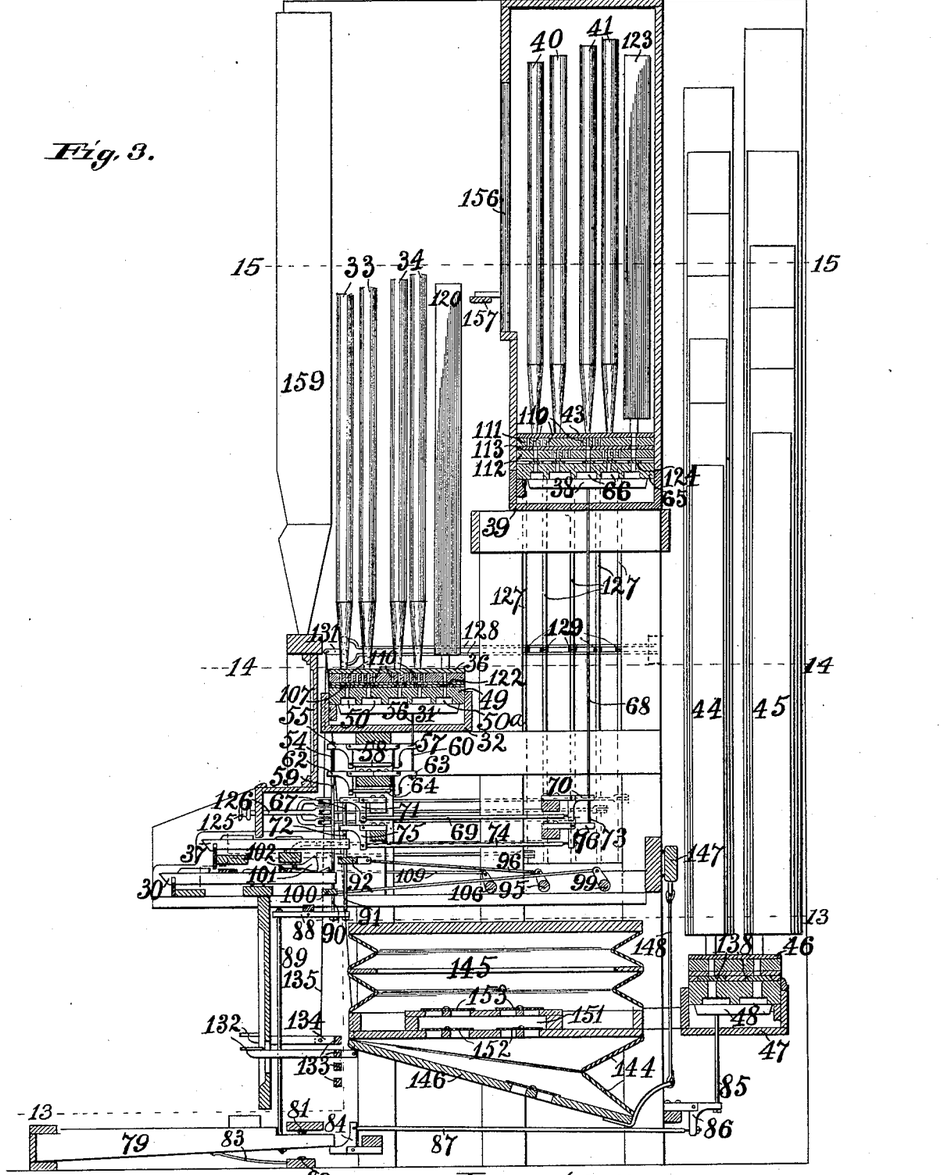
Fig. 3 is a transverse vertical sectional view of the organ on a plane passing a little to the right of the center of the organ, as seen by looking from the right-hand side of Fig. 1.
Figure 4:
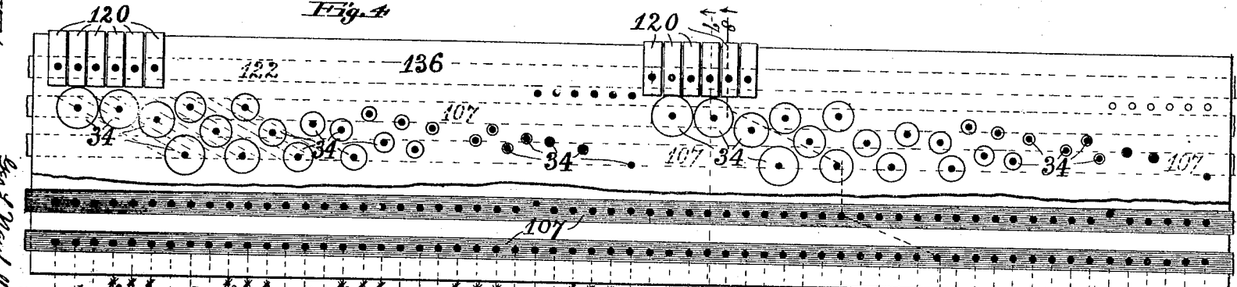
Figure 5:
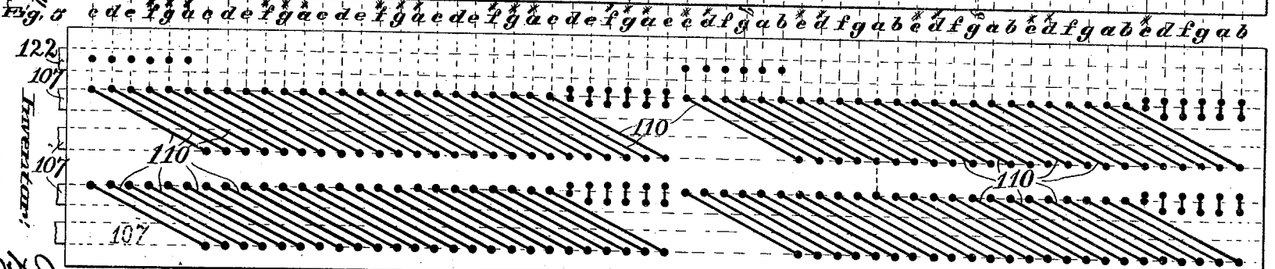
Fig. 5 is a diagrammatic plan of the groove-board adapted to be used with the sound-board and slides shown in Fig. 4, indicating the position and direction of the grooves or passage-ways through which the air passes to the pipes when the valves are operated, the heavy black dots marking the termination of the grooves and indicating substantially their width, whereas the heavy black lines representing the grooves are made of considerably less width for the sake of greater clearness.
Figure 6:
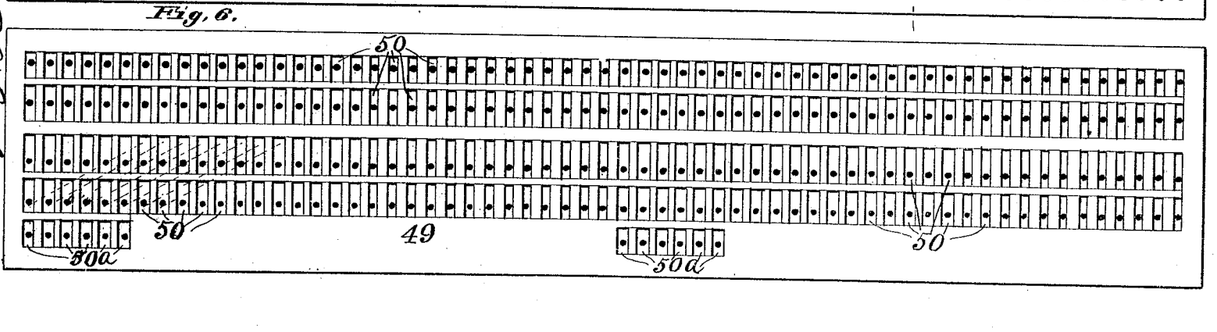
Fig. 6 is a bottom view of a preferred form of valve seat, against which are normally seated the valves which control the speaking of the pipes of the great organ, for example, the black dots in said Fig. 6 indicating the perforations in the valve seat, with which the perforations in the slides are adapted to register when the musical stops controlled by said slides are brought into requisition.
Figures 7, 8, 9, 10, 11, 12:
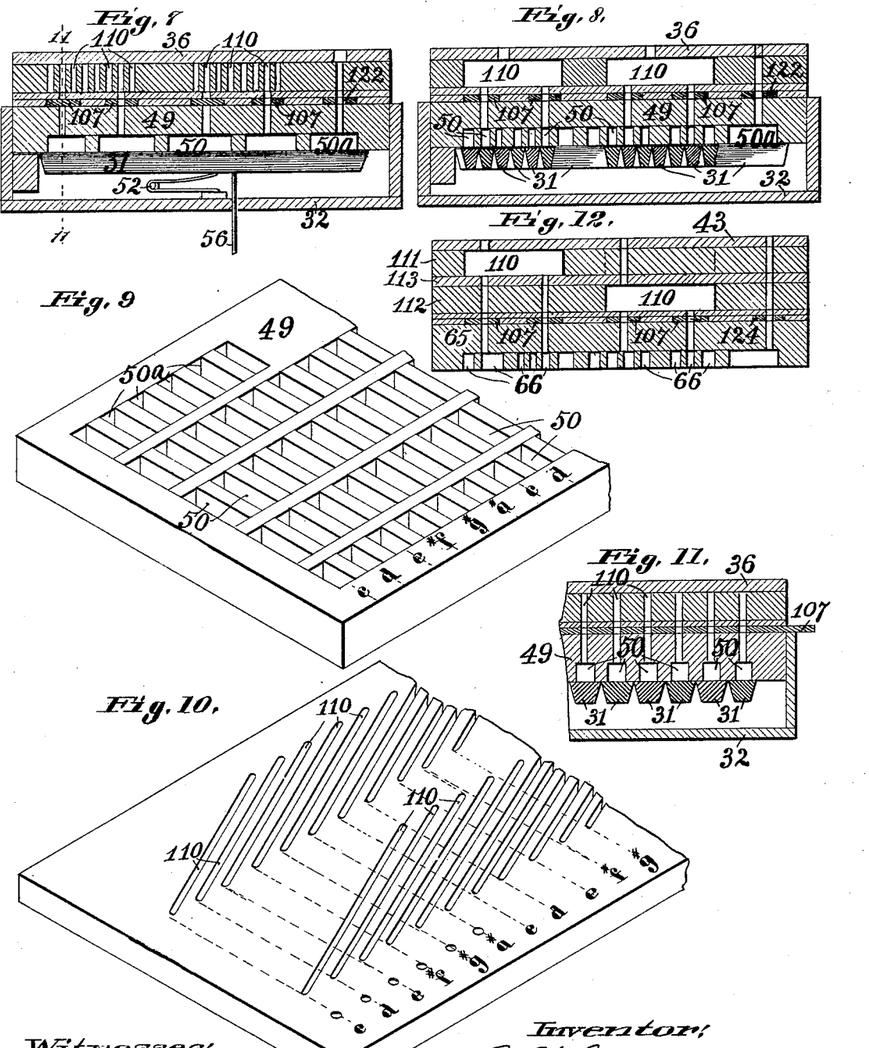
Figure 14:
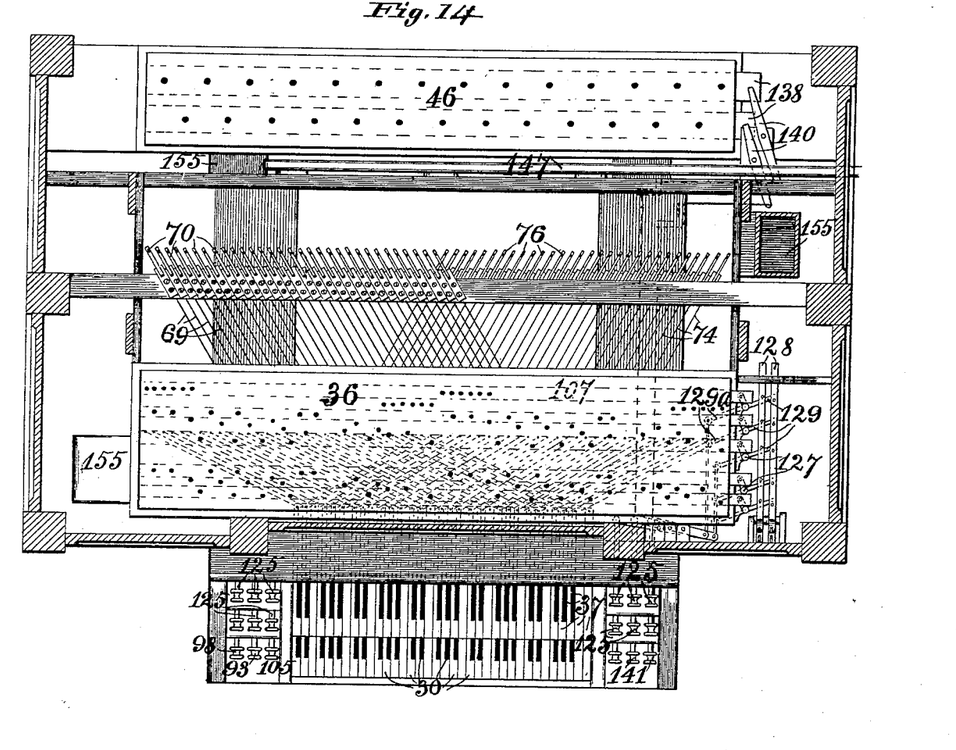
Fig. 14 is a sectional plan-view of the organ on the plane of the line 14, 14 of Fig. 3, showing particularly the arrangement of the mechanism for connecting the keys of the manuals with the valves.
Figure 15:
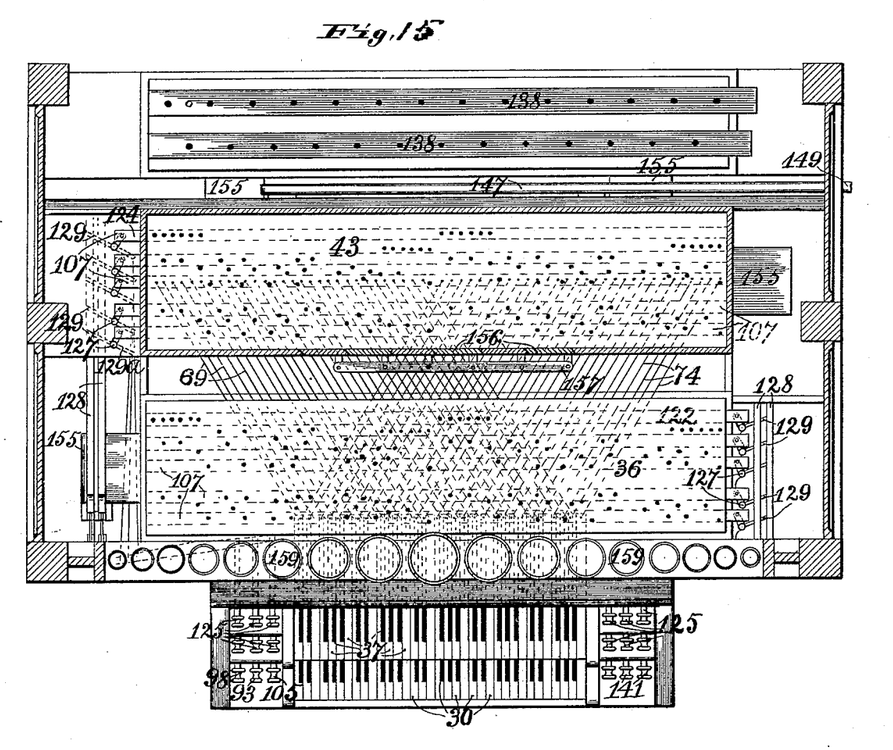
Fig. 15 is a sectional plan-view on the plane of the line 15, 15 of Fig. 3, showing key connections.
Figure 17:
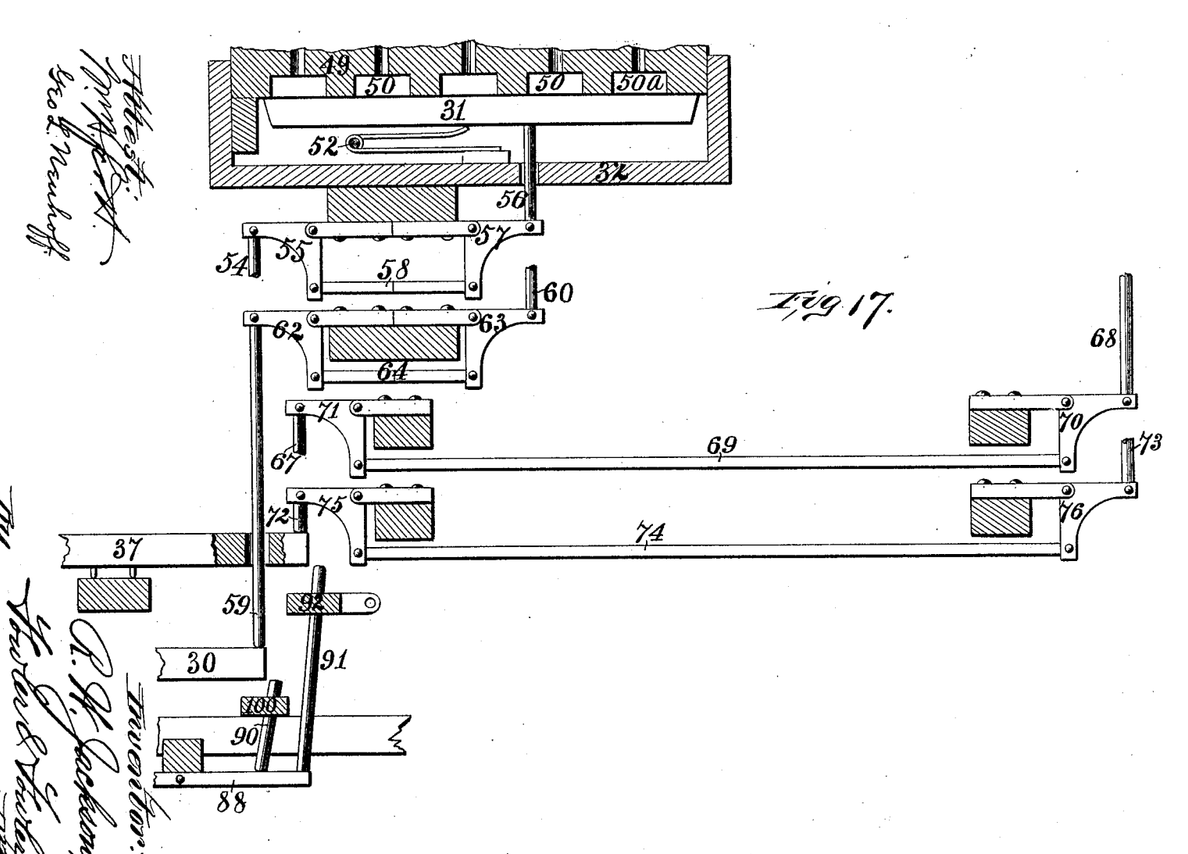
Fig. 17, is an enlarged view of the key and valve connections shown in Fig. 3.

The valves 31 (Figs. 3 and 7) are preferably hinged at the front end to the valve seat 49, each being normally held to its seat by a spring 52, or other suitable means. The key 30 is mounted on a vertical pin 53 of the usual construction, but instead of mounting the key on said pin at the extreme back end of the key, I mount the key at or near its middle, so that normally the front and back portions of the key counterbalance each other. In this manner I am enabled to use a spring 52 of less tension than would otherwise be required to hold the valve and key in their normal position, whereby the key resistance is diminished. The key 30 may be connected to the valve 31 in the following manner: The lower end of a vertical rod 54 rests upon or is suitably connected to the rear end of the key 30 (Fig. 3), the upper end of said rod being flexibly connected to the horizontal arm of a bell-crank 55 (Figs. 3 and 17). A vertical rod 56 extends downward from the valve 31, its lower end being flexibly connected to the horizontal arm of a second bell-crank 57. The vertical arms of said two bell cranks are connected by a suitable link 58, so that when the horizontal arm of bell-crank 55 is raised by depressing the key 30, the horizontal arm of bell-crank 57 will be depressed, drawing the valve 31 from its seat by means of rod 56, but as soon as the key 30 is released said valve is at once returned to its seat, and all parts are restored to their normal position by the spring 52 above referred to (Fig. 7). Inasmuch as the pipes are, for reasons above explained, not usually directly behind the respective keys whereby they are operated, it follows that the connections just described between vertical rod 54 (extending up from the key 30) and vertical rod 56 (extending down from valve 31) must ordinarily be mounted in a plane extending diagonally across the organ. If the valves 31 were, like the keys 30, arranged in regular succession from right to left according to the order of the chromatic scale, in other words, were the valves which control the "lowest C pipes" of the great organ at the extreme left of the sound-board, with the valves controlling the "lowest C pipes" next to the right, then the valves controlling the D's, and so on through the entire scale to highest C, in that event it would evidently be necessary to arrange successive key-and-valve connections so to speak, radially, that is, those to the extreme left extending from the keys back and toward the left, the middle ones extending almost directly back from the keys, and those to the right extending from the keys back and toward the right. Scarcely two of these connecting devices could, therefore, be mounted in parallel planes, and moreover, as the keys and valves respectively are preferably arranged in straight lines, corresponding parts of the connections would have to be of different length for each successive key, rendering the construction of such an organ exceedingly tedious and complicated. To avoid this, I arrange the keys, and valves controlled by the same as follows (Figs. 14 and 15): A number of successive valves are connected to keys selected at intervals from the entire manual, or at least from a considerable portion thereof, the keys being selected at such intervals that all the valves are in the same positions relative to their operating keys, whereby all of said valves may be operated by uniform key connections. The keys occupying the intervals on the key-board aforesaid, are connected in like manner by one or more uniform sets of connections, with valves successively arranged in some other portion of the great organ, so that all the valves of the great organ, for instance, are divided into two or more groups located in different regions of the organ, each group being operated by keys selected at intervals from the entire key-board, or from a considerable portion thereof, whereby a uniform set of connections will answer to connect to their operating keys all the valves constituting a single group. For example, consider the sound-board and valve seat as made up of two fields, the right field or portion to the right of the center, and the left field or portion to the left thereof. The valve controlling the lowest C's of the different stops, as aforesaid, is, say, at the extreme left of the left field, and the pipes controlled by said valve are suitably arranged in the left portion of the left field of the sound-board. The valve controlling the next tone of the chromatic scale, to wit: the C#'s of the different stops, is, say, in a corresponding position in the right field of the valve seat, that is, to the extreme left of said field (or about at the center of the organ), and the pipes controlled by said valve are suitably arranged in the extreme left of the right field of the sound-board (Figs. 4, 5 and 6). The valve controlling the next note of the chromatic scale (the D's for the different stops) is placed in the left field next to the right of the C valve. The valve controlling the D#'s is placed in the right field next to the right of the C# valve, and so on throughout the chromatic scale, alternate valves with the pipes controlled thereby being placed on opposite sides of the center of the organ, so that all the valves and pipes giving the C's, D's, E's, F#'s, G#'s and A#'s are arranged consecutively in a group on the left, and all those giving the C#'s, D#'s, F's, G's, A's and B's are arranged consecutively in a group on the right side of the organ, the size of the pipes in each field decreasing toward the right (Fig. 2). It will thus be seen that alternate keys 30 of the key-board operate valves and control pipes on opposite sides of the center of the organ, and if the sound-board is substantially twice as long as the key-board from right to left, which is a convenient length, each field of the sound-board will be substantially of the same length as the key-board, and the position of all the valves in the left field relative to their operating keys, will be precisely the same. So likewise, the position of all the valves in the right field relative to their operating keys, will be precisely the same. The valves in the left field may, therefore, be connected to their keys by uniform and parallel connections, that is, all the rods 54, all the links 58 and all the rods 56 may be of uniform length, and all the bell-cranks 55 and 57 may be precisely alike, and may be mounted at equal distances, and oscillate in parallel planes. So likewise, the valves in the right field may be connected to their keys by uniform connections, rods 59 and 60, bell-cranks 62 and 63, and links 64 corresponding respectively to rods 54 and 56, bell-cranks 55 and 57, and links 58. Bell-cranks 62 and 63 forming part of the key connections of the valves in the right field are, however, mounted in parallel horizontal lines, either above or below bell-cranks 55 and 57, to permit the sets of links 58 and 64 to cross the organ diagonally in different directions, to connect to their respective keys the valves in the right and the valves in the left field, as aforesaid Figs. 3 and 17. The dotted lines in Fig. 14 indicate diagrammatically the position of the links 58 and 64.

The valves 38 and valve seat 65 of the swell organ are substantially similar to the valves 31 and valve seat 49 of the great organ, each valve controlling a row of depressions 66 on the lower side of the valve seat, and all the depressions controlled by any one valve communicating with pipes speaking the same note nominally, but each speaking said note of a different musical stop, that is, the valve to the extreme right, for example, controlling the admission of air to the pipes speaking highest B of salicional, violin, lieblich gedacht and harmonique flute, for example, the next valve controlling highest A for these same stops, and so on, all the pipes speaking C's, D's, E's, F#'s, G#'s and A#'s being arranged consecutively in a group in the left field, and the remaining pipes and valves in a group in the right field of the organ. The connecting mechanism between the keys and valves in the swell organ is substantially similar to that in the great organ. Rods 67 and 68, links 69 and bell-cranks 70 and 71, each connect to their keys the valves in the left field of the swell organ, for example, and correspond respectively to rods 54 and 56, links 58, and bell-cranks 55 and 57 in the great organ, rods 72 and 73, links 74, and bell-cranks 75 and 76 which connect to their keys the valves in the right field of the swell organ, corresponding to rods 59 and 60, links 64, and bell-cranks 62 and 63 of the great organ respectively Figs. 3 and 17. The bell-cranks 75 and 76 are mounted in parallel lines below the bell-cranks 70 and 71, the sets of links 69 and 74 crossing the organ diagonally from right to left and from left to right respectively, in like manner as links 58 and 64 of the great organ, links 69 and 74, being, however, of greater length than links 58 and 64, owing to the greater distance between the keys and valves of the swell organ (Figs. 3 14, 15 and 17).

The great bass pipes 44 and 45, of which there may be as many as desirable or convenient, are controlled by the pedal keys 79 as aforesaid. These keys are preferably mounted each on a fulcrum at its fore-end (Fig. 3) the rear end of the key being adapted to oscillate up and down between stops 81 and 82, and being normally held to the upper stop 81 by a spring 83 pressing against the under surface of the key. The movable or rear end of the key 79 rests upon or is suitably connected to the horizontal arm of a bell-crank 84. A vertical rod 85 extending down from valve 48 is connected to the horizontal arm of another bell-crank 86, and the vertical arms of these two bell-cranks 84 and 86 are suitably connected by a link 87. When bell-crank 84 is depressed by depressing the key 79, the horizontal arm of bell-crank 86 is likewise depressed, drawing from its seat the valve 48 by means of rod 85, whereby the pipe or pipes controlled by said valve are caused to speak. When key 79 is released, said key and the mechanism just described are returned to their normal position by the spring 83, valve 48 being returned to its seat, whereby the admission of air to the pipe is cut off.

The pedal keys 79 may be coupled with the keys of the respective manuals in the following manner (Fig. 3): A lever 88 is mounted on a fixed pivot near its middle, one of its arms being connected by a vertical rod 89 to the rear end of pedal key 79, and its other arm being provided with vertical rods 90 and 91 flexibly connected to said lever, and normally extending upward to a point just behind the rear ends of the keys in the respective manuals of the organ, which are to be coupled with such pedal keys 79 (see Fig. 17). Each pedal key 79 is provided with a lever 88 having rods 90 and 91, the length of each rod 90 being such that when shifted slightly forward (in the manner to be hereinafter described) its upper end will rest just beneath the key in the lower manual which is to be coupled with pedal key 79, and in like manner the length of each rod 91 is such that when tilted slightly forward, its end will just touch or be just beneath the rear portion of the key in the upper manual which is to be coupled with pedal key 79. If the rods 90 be tilted forward and any pedal key 79 be depressed, the rear end of the corresponding key of the lower manual will be raised by the rod 90 through the intermediate mechanism just described, and the valve 31 of the great organ corresponding to such key of the lower manual will be moved from its seat. In like manner if rods 91 be tilted slightly forward the keys 37 of the upper manual and the valves 38 of the swell organ controlled thereby, will be coupled to the pedal keys 79. By tilting either the rods 90 or the rods 91 as aforesaid, not only the pipes 44 and 45 properly controlled by said pedal keys, but also the pipes of either the great organ or of the swell organ, or both, may be made to speak by depressing the pedal keys.

Referring now more particularly to the great organ mechanism, it has been stated that there is for each key 30 a valve 31 which, when moved from its seat, uncovers as many depressions 50 in the valve seat as there are musical stops in the great organ, all the depressions controlled by one valve serving for the admission of air to pipes speaking the same note nominally, but each speaking said note in a different musical stop. All the depressions corresponding to the same musical stop are preferably arranged in a row extending from right to left across the valve seat; thus, there is a distinct row of depressions (Fig. 6) and a separate slide 107 controlling the same extending from right to left across the organ, for each musical stop of the great organ. In order to diminish the number of pipes of the organ in the manner pointed out in United States Letters Patent No. 480,949 above referred to, I arrange, adjacent to each other in pairs, the slides 107 controlling the musical stops which are alike in timbre, but different in the pitch of the tone. Thus, for example, I put side by side open diapason slide and octave slide,—melodeon and flute d'amour slide, &c. The air in passing from the windchest to a pipe of the organ, first enters one of the depressions 50 in the valve seat 49 (Fig. 7): then it passes through a suitable perforation in said valve seat (shown by black dots in Fig. 6) and through a similar perforation in the slide 107 (Fig. 4), these two perforations being made to register in the usual manner (Figs. 7 and 8) by manipulating a stop which controls said slide by means hereinafter particularly described. The air thereupon, instead of passing directly through a perforation in the sound-board into the proper pipes, passes first into a groove or passage-way 110 (Figs. 5, 7 and 10), which passage-way communicates with a single pipe of the organ via a suitable perforation in the sound-board 36 (Figs. 3, 7 and 8). It is the air communication afforded by these grooves or passage-ways 110 which enables me to diminish the number of pipes in the manner above referred to, that is to say, each groove 110 is adapted to receive air from the windchest 32 in the manner just described, via two distinct depressions 50 in the valve seat 49, each of which depressions is controlled by a different key and valve (30 and 31), and by a different slide 107. Thus when the key of lowest C and the octave slide are brought into requisition, air is admitted to the same groove 110 and to the same pipe 33 on the sound-board as when the key of next higher C and open diapason slide are brought into requisition. In like manner the same pipe 33 speaks for lowest D of octave stop, and for next higher D of open diapason, which two notes differ only in name, and are essentially the same both in timbre and pitch. In like manner another groove 110 communicating with a single pipe is adapted to admit air to such pipe when lowest D♯ of octave stop, for instance, or next higher D of open diapason slide, is brought into requisition, and so on up to highest C of open diapason, on the right side of the great organ as well as on the left. In like manner one set of pipes 34 speaks for melodeon and flute d'amour stops. The diagonal dotted lines in Figs. 4 and 6 indicate the position of some of the grooves 110 relative to the depressions 50 in the valve seat and the pipes on the sound-board respectively, the position of only a few of said grooves being indicated, so as not to confuse the figures by too many lines.

Figure 16:
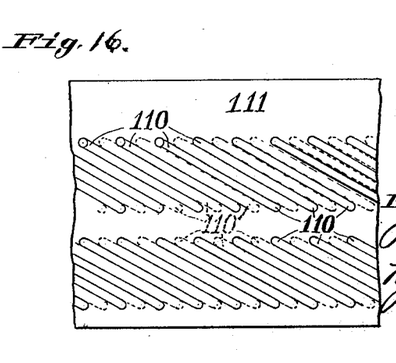
Fig. 16, is a diagrammatic plan-view of a portion of the upper groove-board of the swell organ above referred to, indicating in dotted lines the position of the grooves in the lower groove-board.

All that has just been said of the grooves, valves and slides of the great organ will apply, *mutatis mutandis*, to the swell organ, the same saving of pipes being effected in both, that is to say, the same set of pipes 40 speaking for salicional stop and violin stop, and the same set of pipes 41 for lieblich gedacht stop and harmonique flute stop of the swell organ, just as in the great organ the same set of pipes 33 speaks for open diapason stop and octave stop, and the same set of pipes 34 for melodeon stop and flute d'amour stop. Instead of a single groove-board I may, however, employ a double groove-board, that is, two boards having suitable grooves 110 and arranged at different levels, so that the width of the individual grooves may be greatly increased without their crowding each other. In the drawings (Figs. 3, 12 and 16) the swell organ is provided with a double groove-board, consisting of an upper part 111 and a lower part 112, each having a set of grooves 110, the two parts 111 and 112 being preferably separated by a thin suitably perforated board 113 (Figs. 3 and 12).

The double groove board, that is to say, a plurality of single groove-boards arranged at different levels, clearly affords greater latitude in placing the pipes upon the sound-board, inasmuch as with the single groove-board all the grooves must lie side by side, and all must be parallel to each other. No arrangement of pipes and valves can be used, therefore, (with the single groove-board) which would require any two grooves to cross each other. By using a plurality of such boards, however, and giving to the grooves in each board a different direction, the grooves may clearly be made to cross each other, and many convenient modes of arranging the pipes and valves are thus made available, which would be impracticable with a single groove-board. The thin board 113 interposed between the parts 111 and 112 of the double groove-board shown in the drawings, forms an effectual partition between all the grooves in the upper part 111 and all the grooves in the lower part 112, cutting off all air communication between the same.

The advantage of a double groove-board is most marked when applied to organs having the usual roller-board, since in such organs there is no need of grouping the valves and pipes so as to make it possible to use uniform key connections, as above explained, and therefore, when applied to such organs the double groove-board affords still greater latitude in the placing of pipes and valves, making substantially the entire surface of the sound-board available for the placing of pipes.

Inasmuch as open diapason stop and octave stop, for example, are alike in timbre but differ an octave in pitch, octave stop being tuned an octave higher than open diapason, it is evident that for the highest octave of tones in octave stop there are no corresponding tones of equal pitch in open diapason stop, and consequently to complete the upper register of octave stop it is necessary to add twelve independent pipes which speak only for the twelve highest notes (or highest octave) of octave stop, and are not connected by grooves 110 with openings controlled by open-diapason slide, there being no notes of this pitch in open diapason as explained in my patent heretofore referred to. It may be necessary in order to gain room for these pipes to provide suitable grooves to conduct to them the air admitted *via* the valve-controlled openings, but these grooves constitute no part of my invention. Said twelve additional pipes, like the other pipes of the organ, are, of course, arranged six on each side of the organ, that is the pipes speaking C, D, E, F♯, G♯ and A♯ on the left, and the others on the right, as shown in Figs. 4, and 5, this arrangement being made necessary by the arrangement of valves 31 heretofore fully explained. In like manner the upper register of flute d'amour stop in the great organ, and violin stop and harmonique flute stop in the swell organ, are completed respectively by adding for each a set of twelve additional pipes, all as explained in my aforesaid patent.

Just as the highest octave or flute d'amour stop, for example, has no corresponding tones in melodeon stop, so the lowest octave of melodeon stop has no corresponding tones in flute d'amour stop, and it would be necessary to add to the great organ pipes already mentioned, twelve independent pipes to complete the lower register of melodeon stop, and in like manner twelve independent pipes would have to be added to complete the lower register of open diapason stop. In practice, however, it is found that for the lowest octave of each of these stops there may be substituted an octave of unison bass without injuring the musical effect, and I add, therefore, to the great organ only a single set of twelve unison bass pipes 120 (Fig. 3), which answer for the lowest octave of both melodeon stop and open diapason stop, for instance, said pipes being preferably arranged in a separate row back of the other rows of great organ pipes, and over the respective valves which control the speaking of the lowest octaves of the different stops of the great organ, as aforesaid. In other words, six of these bass pipes are placed in line in the extreme left of the left field (Fig. 4) and six in the extreme left of the right field, the valve seat being provided with twelve additional depressions $50^a$ (Figs. 6 and 9) for the admission of air for said pipes. A separate and independent slide 122 (Figs. 7 and 8), substantially similar to the slides 107 above referred to, controls the speaking of these bass pipes, so that they may be made to speak or not as desired when the keys controlling them are operated. In like manner twelve unison bass pipes 123 are added to the pipes of the swell organ to complete the lower register of salicional stop and lieblich gedacht stop, said pipes being also controlled by a separate slide 124 (Fig. 12).

The slides 107, 122 and 124 hereinbefore referred to, may be of the usual construction, and are operated to move to and fro to permit or prevent the speaking of the pipes, preferably each by means of a stop 125 (Figs. 1, 3, 14, and 15.)

Figure 1:
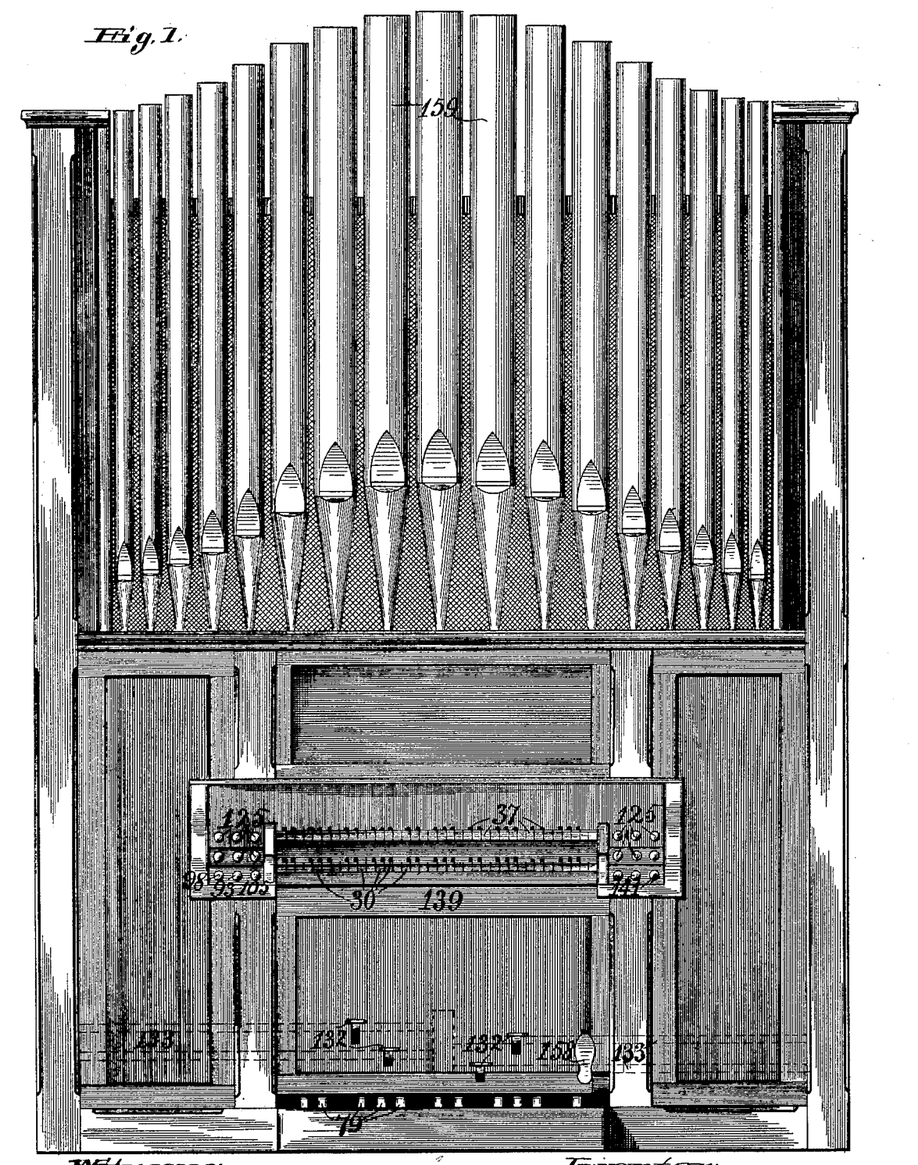
Figure 1 is a front elevation of an organ provided with one form of my improvements, and having two manuals, and a pedal clavier of keys controlling respectively the great organ, swell organ and great bass pipes.
Figure 13:
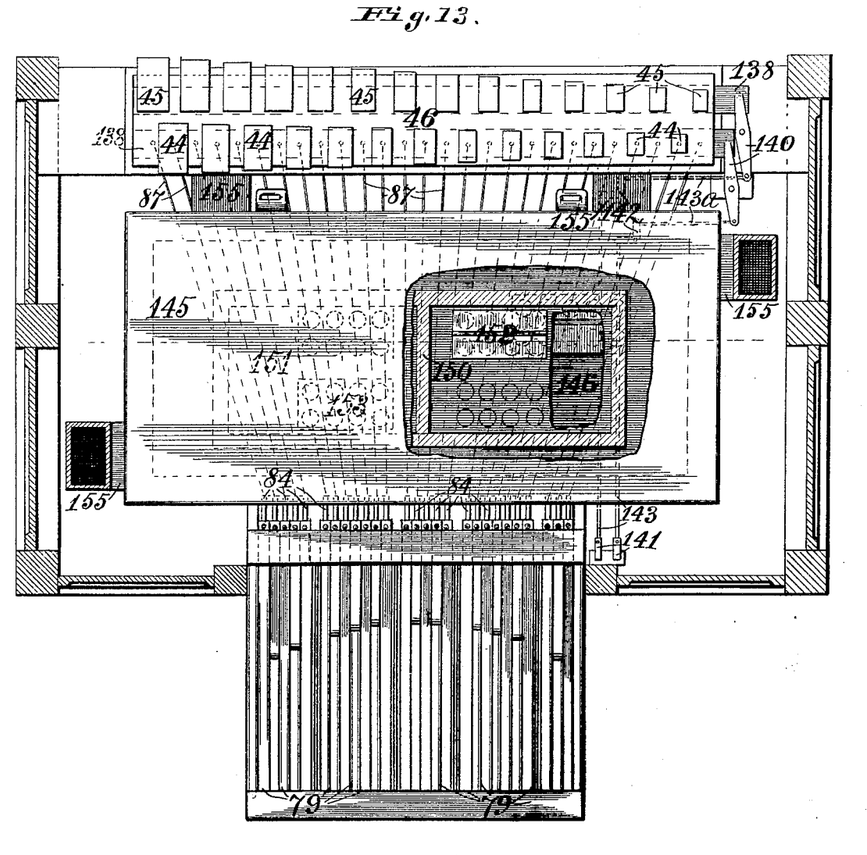
Fig. 13 is a sectional plan-view of the organ on the plane of the line 13, 13 of Fig. 3, illustrating the pedal organ and key-connections therefor.

The slides 138 (Figs. 13, 14 and 15) which control the speaking of the great bass pipes heretofore referred to, may be operated in any suitable manner. For example, each of said slides may be pivoted to the lower and rear end of an obliquely mounted lever 140, the upper and forward end of which is moved to the right or to the left to operate said slide, by pushing in or pulling out a stop 141, the said upper end of lever 140 and said stop 141 being pivotally connected respectively with the two arms of the bell-crank 142 by means of connecting rods 143 and 143ᵃ, as indicated by dotted lines in Figs. 13 and 14. The blast of air for the pipes is created preferably by means of a pair of bellows 144 (Fig. 3). The upper or fixed members of these bellows are preferably joined together, constituting a horizontal partition between said bellows and the storage reservoir 145 which may be of the usual construction. The lower or movable members 146 of the pair of bellows are hinged to the fixed members, and are worked by means of a strong horizontal beam 147 extending across the rear of the organ, and mounted on a fixed pivot somewhat above and midway between a pair of bellows, the opposite arms of said beam being connected respectively to the movable members 146 by links 148. One end 149 of the beam 147 projects beyond the side of the organ (Fig. 2) and may be worked up and down like a pump-handle, the movable members 146 being thereby worked alternately to and fro, the one ascending as the other descends. In the lower portion of the storage-reservoir 145 I place a box medially divided by a partition 150 Fig. 13 into two separate receiving-chambers 151, one pair of bellows discharging into each of said chambers *via* the usual check-valve 152. Each of the receiving-chambers 151 discharges into the storage-reservoir 145 *via* a suitable check-valve 153. The storage-reservoir 145 communicates with the different wind-chests 32, 39 and 47 heretofore described, by means of the usual air-trunks 155.
The swell of the organ (Fig. 15) may consist of the usual series of hinged slats 156 suitably connected to a transverse bar 157 and controlled in any convenient manner, as, for example, by means of a treadle 158 (Fig. 1). These parts form no part of my invention.

As heretofore observed, the connecting mechanism between the keys and valves is substantially uniform for all the keys of any one clavier, that is to say, all the rods, bell-cranks, &c., may be made of certain standard sizes, and are all mounted substantially in the same positions relative to the keys and valves they connect, the only exceptions in the organ illustrated (Figs. 3 and 14) for example, being such as are incident to arranging the valves of successive keys on alternate sides of the organ as above explained. The labor and expense of building organs are, therefore, greatly reduced by my invention, inasmuch as it dispenses with the use of the roller-board and the very complicated and expensive system of rock-shafts and other connections heretofore employed, which required nice adjustment, and pieces of varying size.
It will be observed, of course, that the large tubes 159 resembling organ pipes, serve merely as ornaments and constitute no substantial part of the organ.

In the foregoing specification I have used the term "octave stop" to designate a musical stop of the same timbre as open diapason but tuned an octave higher. It is clear that the note of octave stop which speaks on depressing any key of the great organ will be the same in timbre, but an octave higher in pitch than the note of open diapason which speaks on the depression of such key. In other words, the two notes so controlled by a common valve may be viewed either as being the same note nominally, but each belonging to a different musical stop (for example, middle C of open diapason stop and middle C of octave stop), or they may be viewed as belonging to the same musical stop, but being octaves of each other (for example, middle C of open diapason stop and next higher C of open diapason). The same remarks apply, *mutatis mutandis*, to melodeon stop and flute d'amour stop of the great organ, for instance, and to salicional stop and violin stop, as well as to lieblich gedacht and harmonique flute stop of the swell organ. It is clear, therefore, that the organ herein described is provided substantially with the pneumatic octave-coupling means described in said United States Letters Patent No. 480,949, that is to say, the slides being suitably adjusted, the octaves of the notes in open diapason stop, for example, may be made to respond with said notes without the use of the mechanical octave-couplers usually employed for this purpose, and which serve to couple mechanically the keys controlling the notes to the keys controlling the octaves of such notes, whereby the key resistance, of course, is substantially doubled.

Having fully described my invention, what I desire to claim, and secure by Letters Patent of the United States, is—
1. In a pipe organ, the combination of a group of valves controlling some of the pipes and suitably arranged in one region of the organ, a manual of keys, intermediate mechanism independent of rollers or rock-shafts, extending across the organ and connecting the respective valves composing such group with keys selected at intervals on the manual, and actuating devices connecting the remaining keys with valves arranged in a different region or regions, whereby a large number of valves may be connected to their operating keys by substantially uniform connections.

2. In a pipe organ, the combination of keys, valves controlling the speaking of the pipes, suitable connections between said valves and keys, the valves being divided into a plurality of groups arranged in different regions of the organ, and the valves composing a single group being connected with keys selected at intervals on the key-board, whereby the valves composing any one group may be connected with their respective keys by substantially uniform connections.

3. In a pipe organ, the combination of keys arranged in a suitable manual, valves controlling the speaking of the pipes and occupying collectively a greater width from right to left of the organ than said keys, intermediate mechanism extending across the organ independent of rock-shafts connecting the valves farthest removed from the center of the organ with keys distributed at intervals over the manual, and devices connecting the remaining keys with valves nearer the center of the organ, whereby a large number of keys may be connected to their respective valves by substantially uniform connections.

4. A pipe organ having a manual of keys, valves controlling the speaking of the pipes and occupying substantially double the space from right to left as an equal number of keys, connections between the keys and the valves, successive pairs of keys controlling a pair of valves located in different regions of the organ, and the key-connections controlling the valves in the same region of the organ being substantially uniform in length.

5. In a pipe organ, keys and valves, and key-connections connecting alternate keys with valves on different sides of the organ, the key-connections controlling valves on the same side of the organ being substantially uniform in length.

6. In a pipe organ, the combination of keys, valves controlling the speaking of the pipes, connections between the valves and keys independent of rollers or rock-shafts, and a system of passage-ways, each passage-way leading from a plurality of suitably-controlled openings in the valve seat to a pipe of the organ, the valves being divided into groups arranged in different regions of the organ, for the purpose set forth.

7. In a pipe organ, the combination of keys, valves controlling the speaking of the pipes, connections between the valves and keys, and a system of passage-ways arranged at different levels, each passage-way leading from a plurality of suitably-controlled openings in the valve seat to a pipe of the organ, whereby the width of the individual passage-ways may be increased and those at different levels may be made to cross one another.

8. In a pipe organ having a plurality of musical stops of the same quality or timbre, a plurality of groove-boards arranged at different levels, each groove or passage-way communicating with a single pipe and communicating also with two openings, both leading to the wind-chest but controlled by different slides and keys, whereby the individual grooves or passage-ways may be made of greater section, and the space on the sound-board may be better utilized in the placing of pipes.

9. In a pipe organ, the combination of a key, a valve controlling the speaking of one or more pipes, two levers pivotally connected by means of a link, an arm of one of said levers being suitably connected with a key of the key-board while an arm of the other lever is connected by a rod with a valve of the organ.

10. In a pipe organ, the combination of a manual of keys, valves controlling the speaking of the pipes, and key connections arranged in a plurality of sets of substantially uniform members, each individual key connection consisting of a pair of bell-cranks having their vertical arms connected by a link, an arm of one of said bell-cranks being suitably connected to a key and an arm of the other being suitably connected to a valve.

11. A pipe organ having each alternate pipe of the chromatic scale arranged in groups or fields at opposite sides of the organ, each of said alternate pipes being arranged in the same relative position in each of said groups or fields at opposite sides of the organ, and key connections for causing the speaking of said pipes.

12. A pipe organ having pipes giving the C's, D's, E's, F♯'s, G♯'s and A♯'s arranged consecutively in a group at the left of the organ and the pipes giving the C♯'s, D♯'s, F's, G's, A's and B's arranged consecutively in a group at the right side of the organ, the size of the pipes in each field decreasing toward the right, and key connections for causing the speaking of said pipes.

In testimony whereof I have hereunto set my hand and affixed my seal, this 19th day of December, 1892, in the presence of the two subscribing witnesses.

RICHARD WALTER JACKSON. [L. S.]

Witnesses:
HERBERT K. SPENCER,
PETER N. HOLM.